July 13, 1965 W. B. MACURDY 3,195,106

INFORMATION CHECKING SYSTEM

Filed Dec. 30, 1960

5 Sheets-Sheet 1

INVENTOR
W. B. MACURDY
BY Donald M Duft
ATTORNEY

INVENTOR
W. B. MACURDY
BY Donald M Duft
ATTORNEY

July 13, 1965 W. B. MACURDY 3,195,106

INFORMATION CHECKING SYSTEM

Filed Dec. 30, 1960 5 Sheets-Sheet 3

INVENTOR
W. B. MACURDY
BY Donald M. Duft
ATTORNEY

INVENTOR
W. B. MACURDY
BY Donald M Duft
ATTORNEY

July 13, 1965 W. B. MACURDY 3,195,106

INFORMATION CHECKING SYSTEM

Filed Dec. 30, 1960 5 Sheets-Sheet 5

INVENTOR
W. B. MACURDY
BY Donald M Duft
ATTORNEY

United States Patent Office 3,195,106
Patented July 13, 1965

3,195,106

INFORMATION CHECKING SYSTEM

William B. Macurdy, Belmont, Mass., assignor to Bell Telephone Laboratories, Incorporated, New York, N.Y., a corporation of New York Filed Dec. 30, 1960, Ser. No. 79,886
12 Claims. (Cl. 340—146.1)

This invention relates generally to information checking systems and particularly relates to a system for checking the relationship of elements representing code information characters. The invention more particularly relates to a method and equipment for checking the validity of the odd and even digits in coded plural order numbers and for detecting digit transpositions in such numbers.

Information consisting of coded words, letters, and numbers is customarily used to control the operation of communication systems, computers, and other automatic machines. This information often represents either the data to be processed or the instructions specifying the service to be given by the system. For example, many present day telephone systems are adapted to operate under control of coded combinations of letters and numbers which are dialed by a customer to instruct the telephone equipment regarding the details of the desired service.

A code is herein defined as a system of characters having an ordered sequence of elements for representing information. For example, a code may consist of a system of three-digit numbers and, accordingly, each three-digit number corresponds to a character and each digit of the character corresponds to an element.

Although many checking devices have been incorporated in the aforementioned systems to insure that accurate and reliable results are obtained from the system operation, erroneous results are nonetheless frequently produced due to the presence of undetected errors in the received control information. A common error of this type is caused by the inadvertent transposition of elements representing a character from their customary order. Other errors are frequently caused by abnormal conditions encountered in processing the information through a system. These conditions often change the customary order of elements in a character by adding an invalid or deleting a valid character element.

Many of the aforementioned systems become practically useless if there is no assurance that the control information is free from such transpositional errors. In computers, for example, even an occasional single transposition error can cause the validity of any computation to be in doubt unless adequate checking methods are used. As a consequence, a substantial amount of time is generally spent by personnel in checking and rechecking the control information to insure that it is error-free before it is applied to the system. This checking procedure is usually a slow and tiring task and is yet susceptible to human error. In many other instances, the information is not checked before it is applied to the system, and hence the occurrence of a transposition error in the control information may not be detected until after the system has completed the operations specified by the erroneous information.

In telephone systems, for example, a customer frequently will inadvertently transpose digits during the dialing of a called customer directory number, and, as a result, the error is not detected until after the call is completed to the wrong telephone station. Obviously, whenever such erroneous results are caused by either human mistake or an undetected equipment failure, valuable time is wasted, the system equipment is unnecessarily held out-of-productive service, and the operating cost of the system is increased.

In view of the foregoing, it is desirable to provide a method and equipment for simplifying the procedures of checking the validity of the control information for such systems, and for reducing the amount of erroneous results produced by such systems due to transpositional errors in the input or control information.

A general object of this invention is to simplify the procedures for checking the validity of elements in coded characters of information.

A main object is to reduce the erroneous operations of communications systems, computers, and other automatic machines occasioned because of transpositional errors in the elements of characters comprising the control information for such systems.

A particular object is to minimize the time that equipment in such systems is needlessly held out-of-productive service due to transpositional errors in the elements of code characters of control information.

Another object is to reduce the operating costs of such systems by guarding against certain transpositional errors in the elements of coded information characters which control the operation of such systems.

The principles of the invention are illustrated herein by way of an exemplary embodiment which checks the validity of the digits in plural order numbers and detects transpositional errors, such as the interchanging of adjacent digits, the addition of an invalid digit, and the deletion of a valid digit in such numbers. The plural order numbers are encoded according to a rule which specifies that valid numbers shall have digits of the odd order of a magnitude not less than the magnitudes of adjacent digits of the even order. This predetermined relationship of the digits provides a basis for readily checking their validity and for detecting transpositional errors when the digits are not in conformity with the encoding rule. For example, in accordance with the encoding rule, the number 548 is a valid number, and 379 is invalid because the first odd order digit 3 is less than the first even order digit 7.

The encoded numbers are used in the exemplary embodiment of this invention as directory numbers for telephone customers, and accordingly, the exemplary embodiment includes equipment which is utilized in a telephone system to check the validity of a called customer number and to detect a digit transposition in the number during the progress of a telephone call. The equipment includes circuitry for sequentially receiving each digit of the called customer number as it is transmitted from a calling telephone set, and circuitry for comparing the magnitude of each received digit, except the first, with the magnitude of the immediately preceding digit to check it against the encoding rule before it may be utilized by the conventional telephone equipment to complete a call. Circuitry is also provided for allowing the conventional telephone system equipment to utilize all of the checked digits to complete a call if and only if the comparing circuitry indicates that the magnitude of each of the odd order digits is greater than or equal to the magnitudes of the adjacent even order digits in the called number. The disclosed equipment also includes circuitry, which is operative when any one of the compared digits is not in conformity with the encoding rule, for preventing the conventional telephone equipment from utilizing the called number, and for effecting the transmission of a tone signal to the calling customer telephone set to inform the customer that he should retransmit the correct called number.

An advantage of this invention is that the procedure for checking the validity of coded characters of information is simplified. Other advantages are that the method and equipment provided by this invention, when incorporated in a system, reduce the erroneous operations resulting from transpositional errors, minimize the time that other system equipment is out-of-productive service due to transpositional errors, and therefore lowers the operating cost of the system.

A feature of this invention is the provision of a method and equipment for checking the acceptability of the information characters of a code in which each of the valid characters comprises a series of odd and even order elements having a predetermined relationship to one another.

Another feature is the provision of error detecting equipment including apparatus for comparing the magnitudes of the adjacent odd and even order digits of a plural order number, and apparatus for detecting an error in the number if and only if the comparing apparatus indicates that an even order digit is greater than an adjacent odd order digit.

Another feature is the provision of a circuit for checking the acceptability of electrical signals representing the odd and even order elements of coded information characters wherein the circuit comprises apparatus for dividing the received signals of each element in a character into corresponding odd and even order groups, apparatus for comparing the signals in these groups to check the relationship of the elements to one another, and apparatus for manifesting that compared signals are acceptable if and only if the compared signals represent elements having a predetermined relationship to one another.

Another feature is the provision of an information character element checking system comprising equipment for storing electrical signals which are received from a source and which represent the odd and even order character elements in a series of information character elements; equipment for ascertaining the relationship between the stored signals; and equipment for transferring the stored signals to a signal utilizing device if, and only if, the ascertaining equipment indicates that the stored signals represent character elements having a predetermined relationship to one another.

Another feature is the provision of a method and equipment for eliminating the transmission of invalid digits in coded plural order numbers from a source to a utilization circuit. This method and equipment provides facilities for comparing the magnitudes of adjacent odd and even order digits of a plural order number as they are sequentially received from a source, facilities for allowing the transmission of the compared digits from the source to the utilization circuit, if, and only if, the compared digits of the odd order are not less than the adjacent even order digits in the number, and facilities for effecting the transmission of indications to the source and the utilization circuit signifying the detection of an invalid digit if, and only if, the comparing equipment indicates that an odd order digit in the number is less than an adjacent even order digit in the number.

Another feature is the provision of a number checking system comprising a source subject to erroneous operation in supplying electrical signals representing the odd and even order digits of a plural order number; circuitry for translating digit signals received from the source into multi-bit electrical signals having a most significant bit signal, intermediate bit signals, and a least significant bit signal for each of the odd and even order digits; circuitry for storing each of the bit signals of a pair of adjacent odd and even order digits received from the translating circuitry; circuitry for sequentially comparing the stored bit signals to ascertain whether the magnitude of the odd order digit is equal to, greater, or less than the magnitude of the adjacent even order digit; circuitry for controlling the comparing circuitry to effect, in the following order, a progressive comparison of the stored most significant bit signals, intermediate bit signals, and least significant bit signals until the comparing means ascertains the magnitude relationship of the digits represented thereby; circuitry for utilizing the bit signals of the digits; and circuitry for transmitting the compared multi-bit signals of the highest ordered one of the adjacent odd and even digits from the translating circuitry to the utilizing circuit if, and only if, the comparing circuitry indicates that the ascertained magnitudes of the odd order digit is not less than the ascertained magnitude of the adjacent even order digit.

The foregoing objects, advantages, and features of the present invention as well as others will be apparent from the subsequent descriptions of the exemplary embodiment thereof shown in the drawings.

A clear and complete description of the invention is facilitated by reference to the five sheets of drawings which show, in block and symbolic diagrams, the exemplary telephone system in which the invention and its features are embodied.

Figure 1:
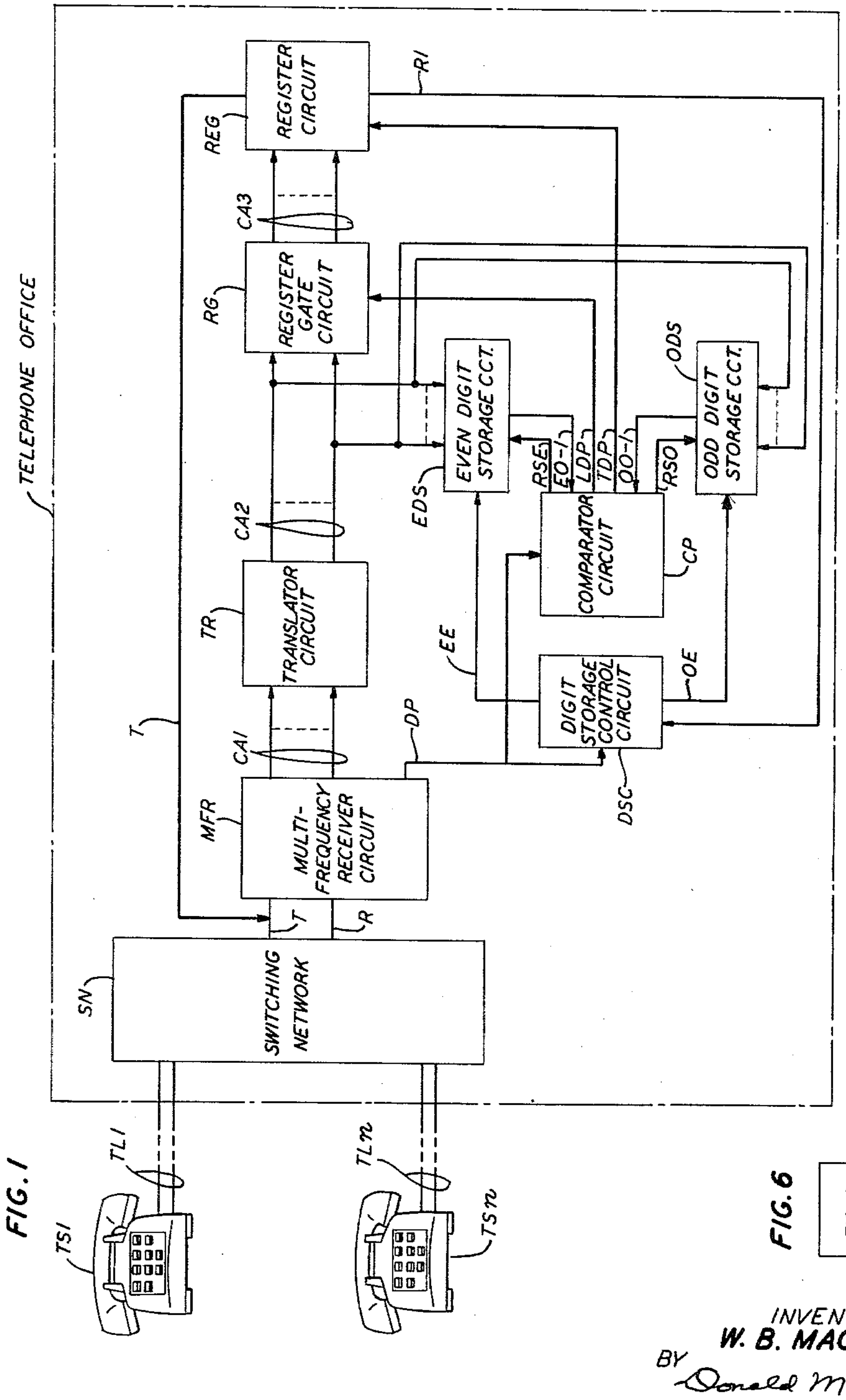
FIG. 1 illustrates, in block diagram form, the interrelation of the component elements of the exemplary embodiment of the subject invention.

Although the symbolic representations of circuits in the drawings are well understood in the art, a brief description of certain circuits is presented for the purpose of clarity. The symbols that are not described are appropriately identified in the drawings. In the drawings, transmission gates, DC buffer amplifiers, flip-flops, monopulser circuits are shown in symbolic form because each one is well known in the art. For example, the AND and OR gate circuits may be constructed of semi-conductor or vacuum tube devices and may be similar to the corresponding circuits described in the text "Reference Data for Radio Engineers," chapter 30, pages 886 and 887, Fourth Edition, printed by American Book, Stratford Press, Inc., New York. For this reason, the description of the various circuits will be of a general nature and only those details which are necessary for a complete understanding of the instant invention will be presented.

Figure 2:
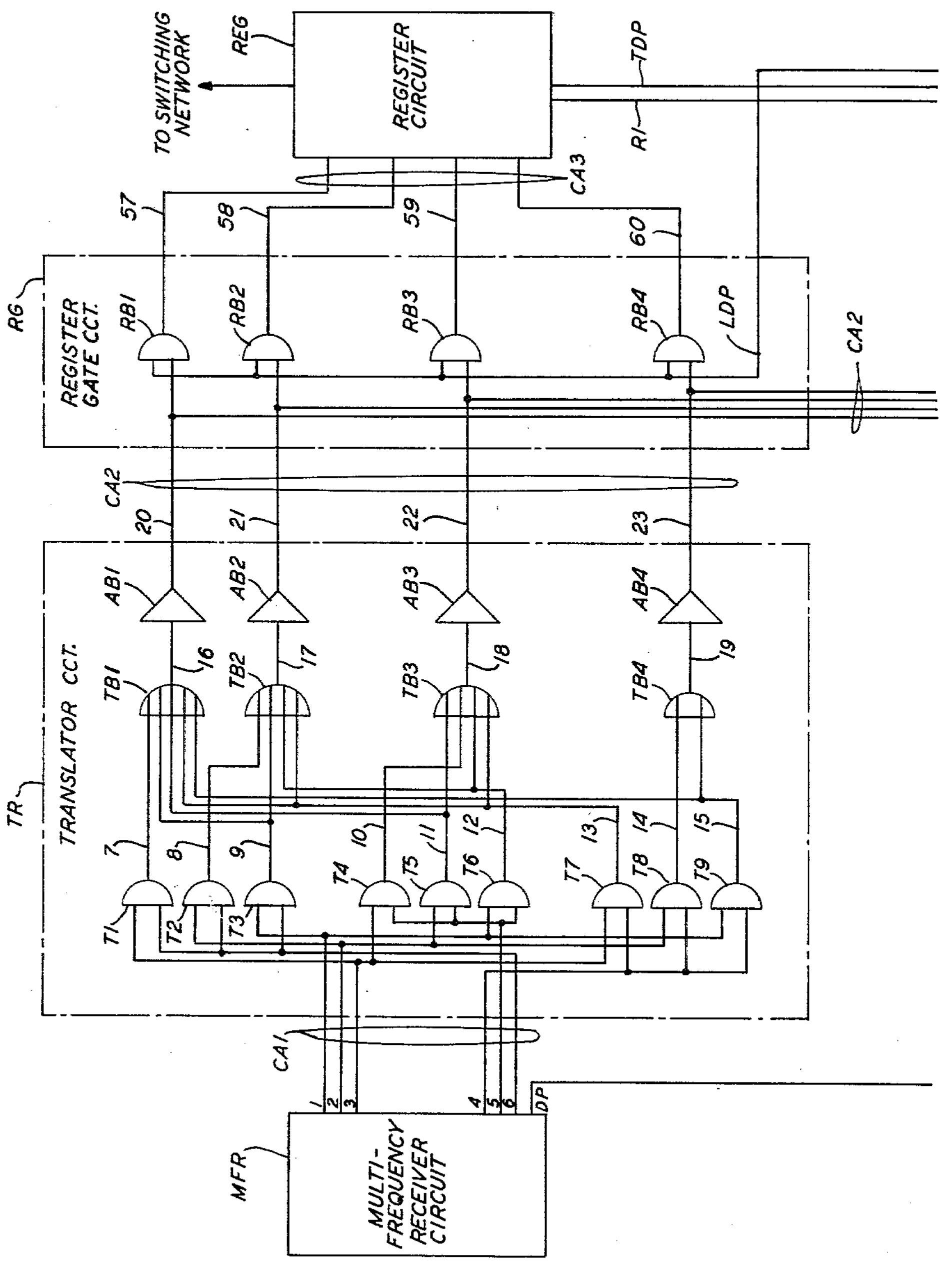
FIG. 2 illustrates, in block and symbolic diagrams, the translator and register gate circuits of the check circuitry interconnecting a multifrequency receiver circuit and a register circuit.

The symbol for each of the AND gates used in the circuitry of FIGS. 2 to 5 is a closed crescent with leads terminated at its periphery. Each of these gates, such as gate RB1 of FIG. 2, is a coincidence type gate which functions to receive ground and negative potential signals over a number of input leads, which are terminated at the flat side of the crescent, and to pass corresponding signals to the output lead extending from the arc side of the crescent. When negative potentials are applied to all of the input leads to an AND gate, or when negative potential is applied to at least one of them, the gate is in the disabled (inhibited) condition and negative potential is passed to its output lead. If ground potentials are applied to all of the input leads, the coincidence of these potentials enables the gate and causes ground to be passed to the gate output lead.

Figure 3:
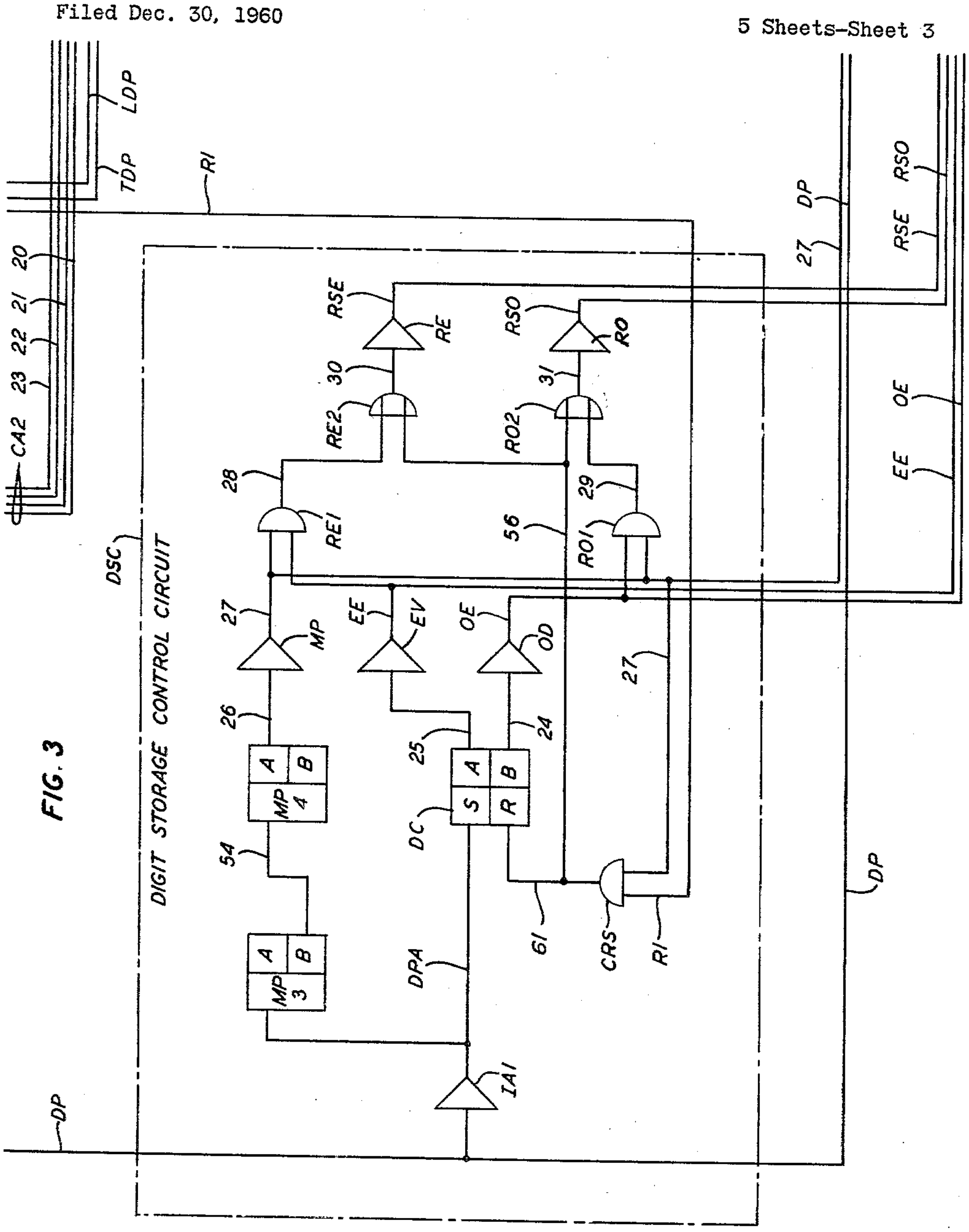
FIG. 3 illustrates, in symbolic diagrams, the digit storage control circuit.

The closed crescents with leads extending into the crescents are the symbols used in FIGS. 2 to 5 to represent OR gate circuits. Each of these gates, such as gate RE2 of FIG. 3, is designed to pass ground potential to the output lead extending to the arc side of the crescent to indicate the enabled condition of the gate whenever ground potential is applied to any one of the input leads terminated at the flat side of the cresent. Negative potential is passed to the gate output lead to indicate the disabled (inhibited) condition of the gate whenever negative potentials are applied to all the gate input leads.

Figure 4:
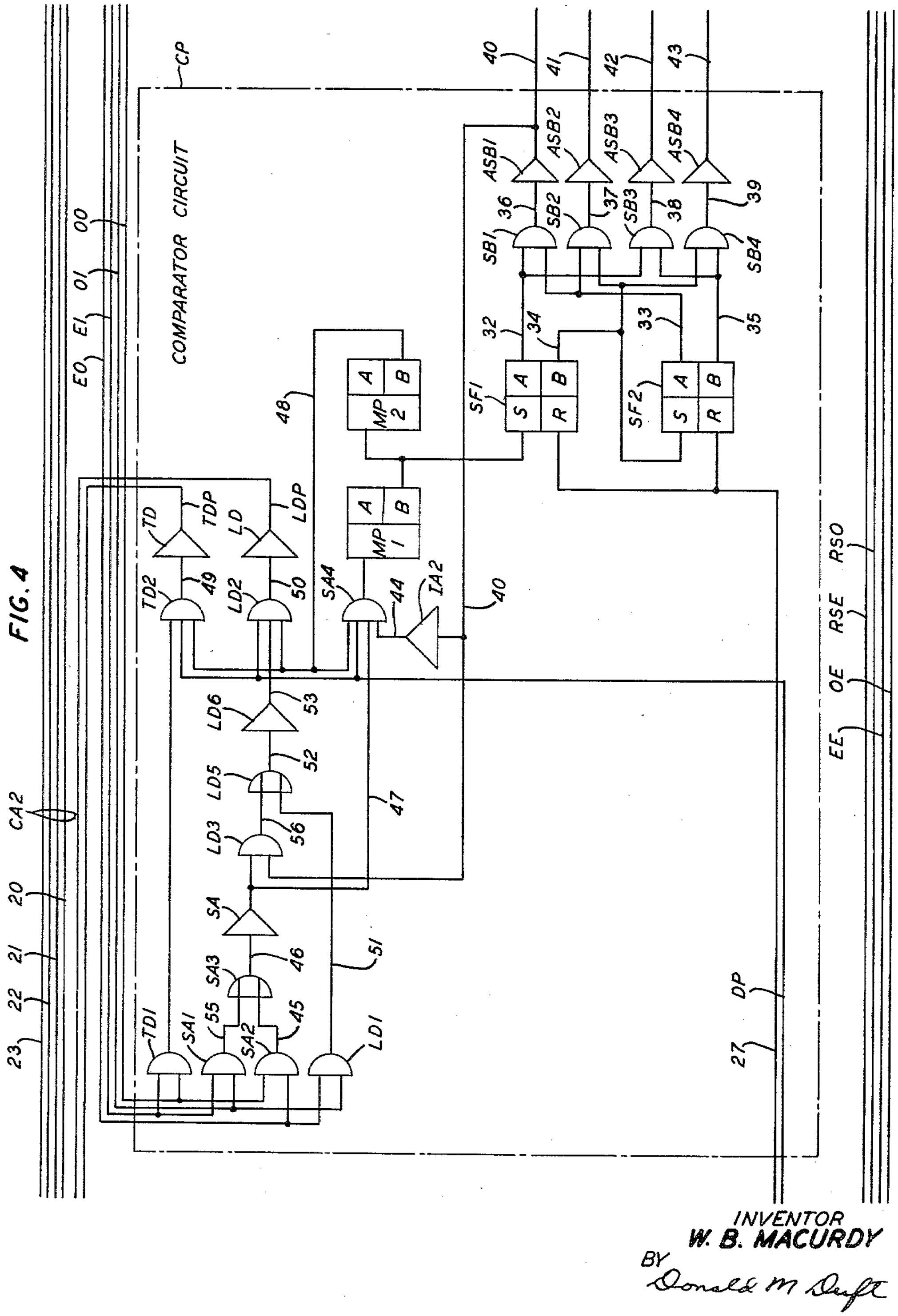
FIG. 4 illustrates the comparator circuit.
Figure 5:
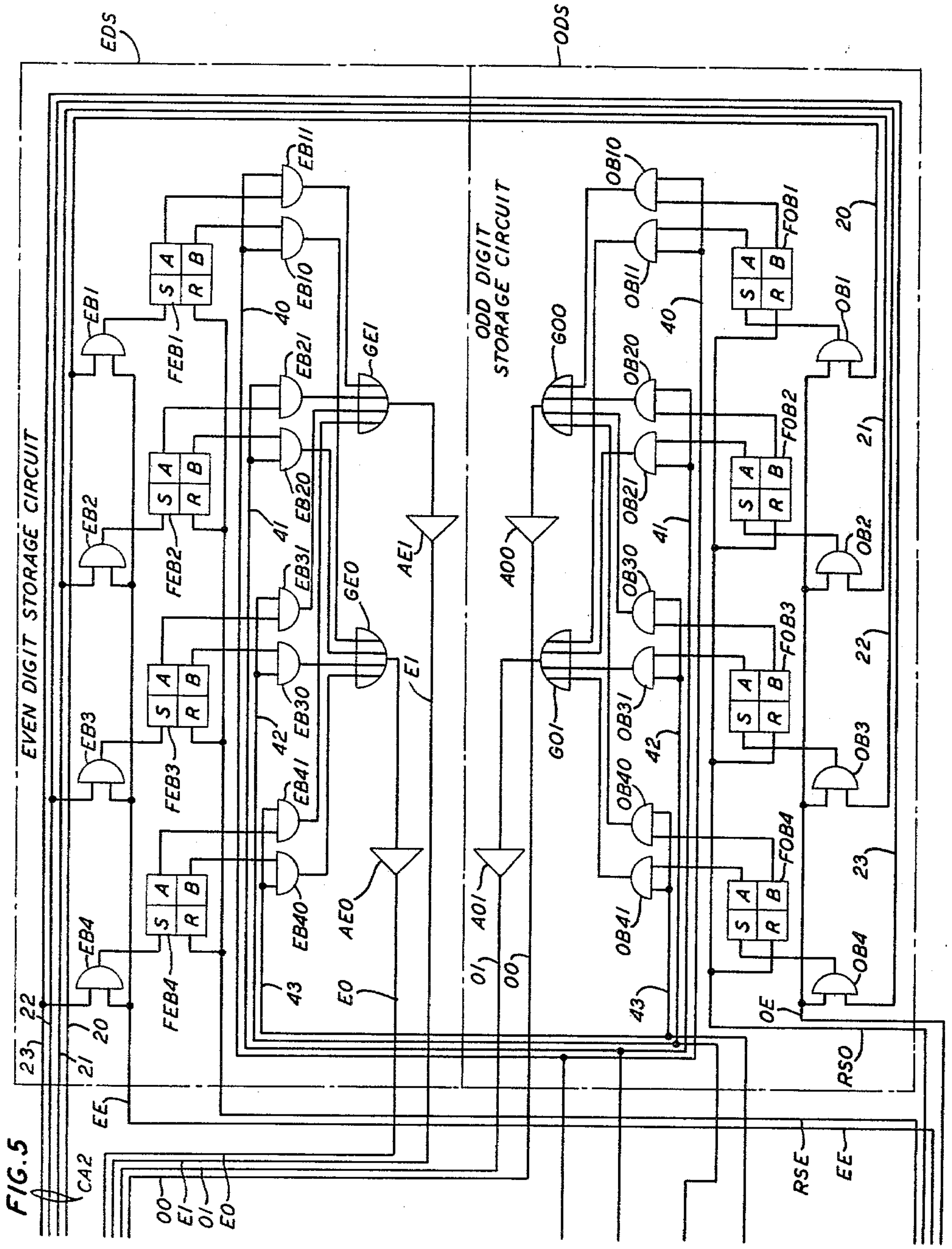
FIG. 5 illustrates the odd and even digit storage circuits.

A triangle is the symbol used to represent a DC buffer amplifier in the circuitry of FIGS. 2 to 5. The triangle points to the direction of signal transmission. The output lead from each D.C. amplifier extends from the point of the triangle and the amplifier input lead is terminated directly opposite on the flat side of the triangle. Two types of buffer amplifiers are used in the circuitry in the FIGS. 2 to 5; one is a non-inverting type and the other is an inverting type, which is uniquely identified by the "I" preceding its functional designation. Each non-inverting amplifier, such as amplifier AB1 of FIG. 2, is designed to isolate the input driving circuit, such as gate TB1 of FIG. 2, from the output utilization circuit, such as gate RB1 of FIG. 2; and to provide impedance matching to the utilization circuit. The non-inverting amplifier provides negative potential on its output lead when negative potential is applied to its input lead and a ground on its output lead when ground potential is applied to its input lead. The two inverting amplifiers IA1 of FIG. 3 and IA2 of FIG. 5 are also used to isolate the input driving circuits from the output utilization circuits and to provide impedance matching to the latter circuits. In addition, each such amplifier inverts at its output the signals applied to its input. For example, when ground is applied to its input it is inverted to a negative signal at the amplifier output; and a negative input signal is inverted to a ground output signal.

A square divided into four sections designated S, R, A, and B represent a bistable flip-flop circuit (hereinafter identified by the symbol F/F) with set and reset input stages and, A and B output stages, respectively. Each of the F/F's, such as F/F DC of FIG. 3, has two stable states; either operated or non-operated. When a F/F is in its normal state, it is non-operated (reset) and the potentials at its two outputs are assumed to be: ground at the output B and negative potential at the output A. When it is operated (set), these potentials are reversed with ground at output A and negative potential at output B. A F/F is operated by the application of a positive pulse to its set input and, after it is operated, is reset to its non-operated state by the application of ground potential to either its set input or its reset input. The unoperated state of a F/F is signified hereinafter as its "0" state and the operated state is its "1" state.

A square divided into three sections labeled MP-, A and B represent monopulser circuits with an MP- input stage, and A and B output stages, respectively. Each of the four monopulser circuits MP1–4 of FIGS. 2 and 4 is designed to produce a ground potential at its output B and a negative potential at its output A when the circuit is unoperated. Whenever a positive pulse is applied to its input stage, a monopulser circuit is operated to produce a ground pulse of two milliseconds duration at its output A and a negative pulse of the same duration at its output B.

Information is often encoded in digital form to obtain maximum speed and accuracy in the operation of communication systems and computing devices. In the exemplary embodiment, the binary system is the basic digital system used to encode numbers. It consists of two symbols, "0" and "1," and is well suited to work with the apparatus of the exemplary embodiment which is inherently binary. The binary modes of operation used herein are, for example, detecting the differences of two DC potentials and the operated or non-operated state of a F/F circuit. To denote the binary states of the input and output signals of the various circuits used herein, a binary "0" is represented by a negative potential and a binary "1" as represented by a ground potential. The ground potential referred to in the subsequent description is generally not an absolute zero potential but is usually slightly negative. For example, a ground potential is generally applied to the input of an AND gate circuit and the output potential produced is usually slightly negative due to voltage drops within the gate.

In the exemplary embodiment, number symbols of the decimal system are translated into the binary digital system. Since there are more than $2^3$ decimal symbols to be represented, the binary representation of each decimal symbol must employ a minimum of four binary symbols in combination. In using four binary symbols, there are sixteen possible combinations of the four symbols, and any one of them may be used to represent any decimal symbol. The information listed in the following Table I shows the symbols of the decimal system and the corresponding symbols of the binary system adapted for describing the exemplary embodiment of the present invention.

TABLE I

| Decimal system: | Binary system |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

Each of the four symbols of a binary encoded number represents a bit of the number and each of the bits has a defined order of significance with respect to the other bits of the number. For example, decimal digit 5 is represented in the binary code as 0101 and the underlined 0 is the most significant bit and the underlined 1 is the least significant bit.

*General description*

The general characteristics of the invention are illustrated in the exemplary embodiment which provides for the transmission of only valid digits of a plural digit number from a customer pushbutton telephone set to telephone office equipment during the progress of a telephone call. The validity of each of the digits of a number is defined by the rule that digits of the odd order shall not be less than those adjacent digits of the even order. Referring to FIG. 1, the customer telephone sets TS1–*n* are connected to the switching network SN of the telephone office by one of the customer telephone lines designated TL1–*n*. The telephone office includes the usual facilities (not shown) of switching gear, battery supplies, etc. for establishing telephone connections in the normal way from the customer line through the network SN to the multifrequency receiver MFR which then receives digits transmitted by the established connections from the telephone sets TS1–*n*. Receiver circuit MFR is associated with circuitry which checks the validity of digits received by receiver MFR before they are passed to the register circuit REG during the progress of a call. The check circuitry includes the following circuits: translator TR, digit storage control DSC, odd and even digit storage ODS and EDS, comparator CP, and register gate RG.

By giving reference to the block diagram in FIG. 1 and to the following general description of a typical telephone call, a general understanding may be gained by the interrelation of the aforementioned circuits and of the functional operations which are involved in transmitting valid digits from the telephone sets TS1–*n* to the register circuit REG and in preventing the transmission of invalid digits therebetween. A telephone call from one of the sets TS1–*n* to the telephone office is originated when a customer lifts the telephone handset from its cradle. In response thereto, equipment (not shown) in the telephone office establishes connections in the usual manner through the switching network SN over the tip and ring leads T and R to the receiver circuit MFR and to the register circuit REG which are jointly associated with the check circuitry. When the register REG is engaged on the call, it returns a tone signal to the customer telephone set over the lead T through the network SN and the customer line to inform the customer to transmit the multi-digit number of the called customer. The first, third, fifth . . . digits of this number are the odd order digits, and the second, fourth, sixth . . . digits of this number are the even order digits. Each digit of the called number is transmitted from the telephone set over the aforementioned connections to the receiver MFR by combinational, nonharmonically related tones (multifrequency signals) by depressing any one of the ten pushbuttons of the customer telephone set. When the tones are transmitted, receiver MFR converts them into D.C. signals and sends the latter MFR converts them into DC signals and sends the latter TR. The circuit TR translates each received digit into a four bit binary code having a most significant bit, intermediate significant bit, and a least significant bit, and routes each odd and even order binary encoded digit over the leads of cable CA2 to the odd and even digit storage circuits ODS and EDS, respectively.

When the first digit of the called number is passed from the receiver MFR to the translator TR, receiver MFR also informs the digit storage control circuit DSC over the digit present lead DP that a digit is present in the receiver MFR. The control circuit DSC at this time enables the storage circuit ODS over the lead OE to store the first binary encoded digit received from the translator TR. Storage circuit ODS stores each of the four binary bits of the received digit in a separate bit register. After the bit storage, the comparator circuit CP sequentially receives each of the stored bits in circuit ODS over the leads O0–1 and compares them with the corresponding stored bits received over the leads E0–1 from the storage circuit EDS to check the first digit against the aforementioned rule. This comparison is made by comparing the most significant bits first and then proceeding to the least significant bits. The check of the first digit always satisfies the encoding rule since a digit "0" is stored in the circuit EDS when the first digit is checked. After the satisfactory check, the comparator CP enables the register gate circuit RG over the legitimate digit present lead LDP to pass over the leads of cable CA3 to the register circuit REG, for storage in a first one of its digit registers, the first binary encoded digit received from the translator TR over the leads of the cable CA2.

When the telephone set pushbutton is released at the end of the first digit transmission, the tone signals are removed from the leads T and R. Receiver MFR detects the removal and causes the temporary release of the translator TR, register gate RG and the comparator CP. It also signals the control circuit DSC to prepare the storage circuit EDS over the lead EE for receiving the second digit. At the same time, circuit DSC disables the storage circuit ODS over lead OE to prevent it from receiving the second digit; however, the binary bits of the first digit continue to be stored in the storage circuit ODS.

The second digit is transmitted to the receiver MFR from the customer telephone set over the connections established therebetween when a second pushbutton is depressed. Receiver MFR then presents the second digit over the leads of cable CA1 to the translator TR which converts it to a four bit binary encoded digit and passes it over the leads of cable CA2 to the even digit storage circuit EDS for storage. Circuit EDS stores each of the four bits in a separate bit register. Following the bit storage, receiver MFR signals the comparator CP over the lead DP to proceed immediately to compare the corresponding significant bits of the first and second digits which are received over the leads E0–1 and O0–1 from the bit registers of the storage circuits EDS and ODS.

This comparison continues until the comparator CP obtains a check answer regarding the validity of the first and second digits with respect to the rule. If the check satisfies the encoding rule, the comparator CP signals the register gate RG over lead LDP to pass the second binary encoded digit from the translator TR over the leads of cable CA2 through gate RG and the leads of cable CA3 to the register REG for storage. On the other hand, if the second digit is greater than the first digit, the check fails to satisfy the rule, and the comparator CP informs the register REG over the transposed digit present lead TDP that an invalid digit has been detected. Register REG then transmits a reorder tone over the lead T through the switching network SN and the customer line to the telephone set to notify the customer to re-transmit the correct called number. The register REG then proceeds to erase the first digit stored in its first digit register and prepares it for receiving another digit. In addition, register REG signals the control circuit DSC over lead R1 to reset the storage circuits ODS and EDS after the pushbutton is released at the end of the second digit transmission and thereby causes the erasure of the first and second digit bits from their particular registers. The first and second retransmitted digits to the receiver MFR are then checked in the above-described manner.

When the telephone set pushbutton is released at the end of a valid second digit transmission, the tone signals are removed from the T and R leads, and the receiver MFR detects the removal and causes the temporary release of the translator TR, register gate RG and the comparator CP. Receiver MFR then signals the control circuit DSC over lead DP to reset the storage circuit ODS over lead RSO to erase from its bit registers the stored bits of the first digit, and to prepare them over lead OE for the receipt of the third digit. Circuit DSC at the same time disables the storage circuit EDS over lead EE to prevent it from receiving the third digit; however, circuit EDS continues to store in its bit registers the bits of the second digit.

The third digit is transmitted to receiver MFR from the customer telephone set when a third pushbutton is depressed. Receiver MFR then passes it over the leads of cable CA1 to translator TR which converts it into a four bit binary encoded digit and thereafter passes the bits over the leads of cable CA2 to the appropriate bit registers of the storage circuit ODS for storage. Thereafter, receiver MFR signals comparator CP over lead DP to sequentially receive over the leads E0–1 and O0–1 the corresponding significant bits stored in the storage circuits EDS and ODS and to compare them until a determination is made regarding the validity of the two stored digits with respect to the rule. Provided the rule is satisfied, the comparator CP enables the register gate RG over lead LDP to pass the third binary encoded digit from the translator TR to the register REG for storage in a third one of its digit registers. If the rule is not satisfied, however, comparator CP informs the register REG of same over the transposed digit present lead TDP, and causes register REG to transmit a reorder tone over the lead through network SN and the customer line to the telephone set to notify the customer to re-transmit the correct called number. Register REG then erases the first, second, and third digits from its digit registers and prepares them for receiving re-transmitted digits. Register REG also signals the control circuit DSC over the lead R1 to reset the storage circuits EDS and ODS after the telephone set pushbutton is released at the end of the third digit transmission, and to thereby erase the stored bits of the second and third digits from its bit registers and to prepare the circuit ODS to receive the first re-transmitted digit. The first, second, and third retransmited digits to the receiver MFR are then checked in the above-explained manner.

Even and odd digits subsequent to a third digit are transmittable to the telephone set to the receiver MFR and are checked in substantially the same manner as described hereinbefore. For example, the fourth, sixth, and eighth digits are checked in essentially the same manner as the second digit. Likewise, the fifth, seventh, and ninth digits are checked in essentially the same manner as the third digit.

Register REG is designed to receive a predetermined number of digits. It recognizes the receipt of the last digit and is arranged to signal the control circuit DSC over the lead R1 to cooperate with the receiver MFR to reset the comparator CP and the storage circuits ODS and EDS after the telephone set pushbutton is released at the end of the last digit transmission. When the pushbutton is released after the last digit transmission, the tone signals are removed from the leads T and R, and the receiver MFR detects the removal and causes the release of the translator TR and the register gate RG. Receiver MFR then signals the control circuit DSC and comparator CP over the lead DP to first reset the storage circuits ODS and EDS and thereby to erase from their bit registers the stored bits of the last and next to last digits, and to then release themselves.

After the register REG has received the entire called number, it utilizes it in a manner well known in the telephony art to control the establishment of call connections between the called and calling customer lines.

*Detailed description*

Figure 6:
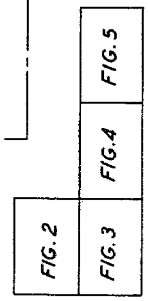
FIG. 6 illustrates the relative position in which FIGS. 2 to 5, inclusive, should be arranged to show an operative arrangement.

Referring now to the detailed circuit representations shown in FIGS. 2 to 5, inclusive, as arranged in accordance with FIG. 6, a detailed circuit description is presented. Before proceeding with the description of the circuit operations involved in transmitting valid digits of a called customer number from the receiver circuit MFR of FIG. 2 to the register circuit REG of FIG. 2, and in preventing the transmission of invalid digits therebetween, it is advisable to indicate first the condition of the circuits of FIGS. 2 to 5 during the interval prior to the receipt of the first digit by the receiver MFR. During this interval, receiver MFR applies negative potentials to the leads 1 to 6 of cable CA1 to cause the disablement of the gates T1–9 in the translator TR of FIG. 2 and thereby to cause negative potentials to be supplied to their output leads 7–15. As a result, the gates TB1–4 of FIG. 2 are disabled and negative potential is supplied to each of their output leads 16–19 wherefrom it is passed through the associated buffer amplifier AB1–4 of FIG. 2 over the leads 20–23 of cable CA2 to disable the gates RB1–4 at register gate RG of FIG. 2 and the gates EB1–4 and OB1–4 in the storage circuits EDS and ODS of FIG. 5. The disabled gates RB1–4 in turn cause negative potentials to be passed over the leads 57–60 of cable CA3 to the register REG of FIG. 2.

Prior to the receipt of the first digit, the receiver MFR also connects the negative potential to the digit present lead DP to control the idle condition of the circuits of FIGS. 3, 4, and 5. This potential is inverted by the inverted amplifier IA1 of FIG. 3 to a ground potential which is coupled over the lead DPA to control the operation of the F/F D.C. and the monopulser MP3 of FIG. 3. At this time, F/F D.C. rests in its "0" (reset) state and, as previously indicated, in such a state ground potential is supplied at its output B and negative potential is supplied at its output A. The ground is passed from output B over lead 24 through the buffer amplifier OD to lead OE for partially enabling the gate RO1 of FIG. 3 and the gates OB1–4 in the storage circuit ODS of FIG. 5. The negative potential from output A is coupled over the lead 25 through the buffer amplifier EV to the lead EE to inhibit the gate RE1 of FIG. 3 and the gates EB1–4 in the storage circuits EDS of FIG. 5. The partially enabling of gates OB1–4 prepares the gates for passing the binary bits of the first digit from the translator TR of FIG. 2 to the bit register F/F FOB1–4 in the storage circuit ODS of FIG. 5. The inhibiting of gates EB1–4 prevents the gates from passing the binary bits of the first digit from the translator TR to the bit register F/F's FEB1–4 of storage circuit EDS of FIG. 5. The monopulsers MP3 and MP4 of FIG. 3, which are used for controlling the resetting of various control circuits of FIGS. 3, 4, and 5, are also in the unoperated conditions prior to the receipt of the first digit. Under such conditions, as previously indicated, negative potential is coupled from the output A of crcuit MP4 over lead 26 through the buffer amplifier MP to lead 27 for inhibiting the reset controlling gates RE1, RO1, and CRS of FIG. 3. The negative potential produced at the outputs of gates RE1 and RO1 are in turn passed over the leads 28 and 29 through gates RE2 and RO2 and the leads 30 and 31 to cause the associated buffer amplifiers RE and RO of FIG. 3 to pass negative potentials over the leads RSE and RSO to the reset inputs of the F/F FEB1–4 and FOB1–4 of FIG. 5, respectively. The negative potential thus applied to these reset inputs, however, has no effect at this time upon the operation of F/F's.

Both of the F/F's SF1 and SF2 in the comparator CP of FIG. 4 are used for controlling the sequence in which binary bits of the odd and even order digits are compared. These F/F's are in the "0" state prior to the receipt of the first digit by receiver MFR to condition the circuits of FIGS. 4 and 5 for comparing the most significant bits which are stored in the F/F's FOB4 and FEB4. As a result, the negative potentials on the outputs A of these F/F's are coupled over the leads 32 and 33 to inhibit the gates SB1–3 in the comparator CP and the ground potentials from the outputs of these F/F's are coupled over the leads 34 and 35 to enable the gate SB4 of FIG. 4. When the gates SB1–3 are inhibited, negative potential is coupled from their respective output leads 36, 37 and 38 through the associated buffer amplifier ASB1–3 and over leads 40, 41, and 42 to inhibit the gate LD3 of FIG. 4 and gates OB10–30, OB11–31, EB10–30, and EB11–31 of FIG. 5. In addition, the negative potential on lead 40 is coupled to the inverted amplifier IA2 of FIG. 4 which inverts it to a ground potential and couples the ground over lead 44 to partially enable the gate SA4 of FIG. 4. The enabled condition of gate SB4 causes ground to be coupled over lead 39 through the buffer amplifier ASB4 and lead 43 to partially enable the gates OB40–1 and EB40–1 of FIG. 5 and thereby condition the storage circuits ODS and EDS for passing the most significant stored bits to the comparator CP.

The F/F's FOB1–4 and FEB1–4 of FIG. 5 are used for storing bits of the odd and even order digits, respectively. These F/F's rest in their "0" states during the period prior to the receipt of the first digit. Consequently, the associted gates OB11–41 and EB11–41 are inhibited due to the negative potential coupled to their respective inputs from the F/F's FOB1–4 and FEB1–4. These inhibited gates in turn cause negative potential to be coupled from their respective output leads through the gates GO1 and GE1 of FIG. 5, the buffer amplifiers AO1 and AE1 of FIG. 5, and over the leads O1 and E1 to inhibit the gates TD1, SA1, and LD1 of FIG. 4. At the same time, the gates OB10–30 and EB10–30 are partially enabled by the ground potentials coupled to their respective inputs from the outputs A of the associated F/F's FOB1–3 and FEB1–3. The gates OB40 and EB40 are fully enabled by the ground potential coupled to their input leads from the outputs B of the F/F's FOB4 and FEB4 and from the amplifier ASB4 of FIG. 4. The enabled condition of these gates in turn causes ground potential to be coupled from their respective output leads through the gates GO0 and GE0, amplifiers AO0 and AE0 of FIG. 5, over the leads O0 and E0 to enable the gate SA2 of FIG. 4. This ground is extended further through the enabled gate SA2 over lead 45 to enable the gate SA3 and thereby to pass the ground over lead 46 through the buffer amplifier SA and lead 47 to partially enable gates LD3 and SA4 of FIG. 4.

During the same period, the monopulsers MP1 and MP2 of FIG. 4 are in the unoperated condition and ground potential is coupled from the output B of monopulsers MP2 over lead 48 to partially enable the gates SA4, LD2, and TD2 of FIG. 4. As was previously indicated, the gates LD2 and TD2 are inhibited under control of the negative potential supplied to the lead DP. Hence, negative potential is coupled from the output of gate LD2 over lead 50 through the associated buffer amplifier LD and the lead LDP to inhibit the bit register gates RB1–4 of FIG. 2.

The circuits of FIGS. 2 to 5 remain in the aforementioned conditions until the first digit is received by receiver MFR.

Proceeding now to the description of the circuit operations involving the transmitting of valid digits of a called customer number from the receiver MFR of FIG. 2 to the register REG of FIG. 2 and in preventing the transmission of invalid digits therebetween, assume that, in accordance with the foregoing general description and FIG. 1, a customer has originated a telephone call from a customer pushbutton telephone set over the customer line to the telephone office, that connections have been established from that line through the network SN to the receiver MFR and register REG, and that the register REG has returned a tone signal to the telephone set to notify the customer to transmit the multi-digit called customer number. The sequence of the circuit operations for checking the validity of these digits is initiated when the calling customer depresses one of the ten telephone set pushbuttons to transmit to the receiver MFR the combinational, non-harmonically related tone signals which represent the first digit. Receiver MFR then converts the tone signals to ground potential on certain leads of cable CA1. The following Table II indicates the decimal system symbol of each digit transmittable from the telephone set, the tone signals corresponding to these digits, and the leads of cable CA1 which are grounded when these signals are received by receiver MFR.

TABLE II

| Decimal Symbol | Tone Signals | Leads of cable CA[1] Grounded |
|---|---|---|
| 0 | 1336, 941 | 2 |
| 1 | 1209, 697 | 3, 6 |
| 2 | 1336, 697 | 2, 6 |
| 3 | 1477, 697 | 1, 6 |
| 4 | 1209, 770 | 3, 5 |
| 5 | 1336, 770 | 2, 5 |
| 6 | 1477, 770 | 1, 5 |
| 7 | 1209, 852 | 3, 4 |
| 8 | 1336, 852 | 2, 4 |
| 9 | 1477, 852 | 1, 4 |

In the following description, it is assumed that the directory number of the called customer is the three digit number 548. In accordance with Table II, when the 1336 and 770 tone signals corresponding to the first odd order digit 5 are received by the receiver MFR, the receiver changes the potentials on leads 2 and 5 of cable CA1 from negative to ground. As a result, the translator TR of FIG. 2 converts the ground signals to the four bit binary potentials representative of the decimal digit 5 on the leads of cable CA2 and passes these potentials to the appropriate bit register stages of the storage circuit ODS of FIG. 5 to effect the storage of the binary encoded digit 5 therein. The conversion is accomplished when the coincident ground potentials on the leads 2 and 5 are applied to the inputs of gate T5 of FIG. 2 to enable the gate to pass ground potential over lead 11 for, in turn, enabling the translator binary bit gates TB1 and TB3 of FIG. 2 to pass ground potential over leads 16 and 18 through the amplifiers AB1 and AB3 to the leads 20 and 22 of cable CA2. It is noted that the potentials on leads 20–23 signify the binary bits of the digit. The potential on lead 20 indicates the least significant bit and the potential on lead 23 indicates the most significant bit. It will be recalled from the previous description that negative and ground potentials represent binary "0" and "1," respectively. Hence, the binary representation of decimal digit 5 in terms of potentials on the leads 23, 22, 21, and 20 is negative, ground, negative, and ground, respectively. This corresponds to the data of Table I.

The ground potentials on leads 20 and 22 partially enable the register bit gates RB1 and RB3 of FIG. 2, and fully enable the gates OB1 and OB3 of FIG. 5 which were, as previously explained, partially enabled by ground potential coupled to lead OE under control of F/F DC of FIG. 3. The enabled gates OB1 and OB3 in turn effect the storage of the binary encoded digit 5 in the storage circuit ODS by passing ground potential to the set inputs of the F/F's FOB1 and FOB3 to operate the F/F's to their "1" states and thereby cause the potentials at their outputs A and B to switch to ground and negative, respectively. The ground potential from the F/F outputs A partially enable the associated gates OB11 and OB31, and the negtaive potentials from the outputs B inhibit the associated gates OB10 and OB30. It is noted that the F/F's FOB1–4 are used to register the four bits of each odd order digit. The F/F FOB1 registers the least significant bit, FOB2–3 the intermediate bits and FOB4 the most significant bit. For registering the digit 5 the states of the F/F's FOB4–1 are 0, 1, 0, and 1, respectively.

The circuits of FIGS. 4 and 5 are now prepared to check the validity of the first digit. At the same time that the first digit is stored in the circuit ODS, the bit register F/F's FEB1–4 in the storage circuits EDS rest in their "0" states to indicate a binary encoded digit corresponding to the decimal digit "0" which is not greater than the digit stored in circuit ODS. As mentioned hereinbefore, the comparator CP will compare the most significant bits in the circuit ODS and EDS and then proceed to compare the less significant bits until a check answer is obtained regarding the validity of the checked digit. Since the "0" bits are stored in the F/F's FOB4 and FEB4, a check answer regarding the validity of the first digit will not be obtained from a comparison thereof. Hence, the circuits of FIGS. 4 and 5 await a signal from the receiver MFR which will cause the comparator CP to receive and check the bits stored in the bit register F/F's FOB3 and FEB3.

Shortly after the first digit is stored in the circuit ODS, the receiver MFR grounds the digit present lead DP to initiate a further check of the first digit. The ground on lead DP is inverted by amplifier IA1 of FIG. 2 to a negative potential which is applied to the inputs of monopulser MP3 and F/F DC; however, none of these circuits operate as a result because a positive pulse is required to operate the circuits. The ground on lead DP is also extended to the input gate SA4 of FIG. 4 to fully enable the gate. When enabled, the latter gate indicates that the compared bits of the digits stored in circuits ODS and EDS do not yield a validity answer, and it causes the next less significant bits of the digits to be received and checked by the comparator CP. To effect this, the enabled gate SA4 passes ground potential to the input of the monopulser MP1 to operate it. Monopulser MP1, as previously explained, then produces a negative potential at input B for a two millisecond duration and then the potential reverts to ground. The ground potential is then applied to the inputs of the monopulser MP2 and the sequence advance F/F SF1 of FIG. 4 to operate both of the circuits. The operated monopulser MP2 changes the potential coupled from its output B over lead 48 from ground to negative for two milliseconds and thereby inhibits the gates TD2, LD2, and SA4 to insure that no false information is passed to the register REG during the period that comparator CP switches from a comparison of the bits stored in the F/F's FOB4 and FEB4 to those stored in F/F's FOB3 and FEB3. As is later described, there is an interval during which the potentials on leads E0, O0, E1 and O1 are switched to and from ground potential at approximately the same time, and as a result the gates TD1, LD1, SA1, and SA2 are temporarily enabled to pass transient ground potentials to the gates TD2, LD2 and SA4. If the latter gates were not inhibited during this interval, under control of monopulser MP2, a transient ground signal would be passed through the gate TD2 over lead 49, amplifier TD, and lead TDP to the register REG to indicate an invalid digit, while at the same time, a transient ground signal would be passed through the gate LD2, over lead 50, amplifier LD, and the lead LDP to the register gate RG indicating a valid digit and thereby to allow the register gate RG to pass the binary encoded digit from the translator TR to the register REG. Meanwhile, the gate SA4 would be enabled by the ground potentials coupled to its input leads from the gates SA1 and SA2 over leads 45 and 55 through gate SA3, lead 46, and amplifier SA to the lead 47 to indicate that the bits under comparison do not yield a check answer regarding the validity of the check digit. Two of these indications would be incorrect or premature and would upset the normal operation of the check circuitry. The gates TD2, LD2, and SA4 are, therefore, inhibited during the interval when comparator CP switches from the comparison of one pair of bits to another.

The F/F SF1 is operated from its "0" to "1" state, as hereinbefore indicated, to cause the storage circuits ODS and EDS to pass the next most significant bit, instead of the most significant bit, to the comparator CP. The negative potential available from the output B of the operated F/F SF1 inhibits the gate SB4 of FIG. 4 to initiate circuit operations in FIGS. 4 and 5 which prevent the stored bits in the F/F's FOB4 and FEB4 from being passed to the comparator CP. The ground potential from the output A of F/F SF1 cooperates with the ground potential from the output B of F/F SF2 of FIG. 4 to enable the gate SB3 of FIG. 4 and thereby to cause circuit operation in FIGS. 4 and 5 which result in the passage of the stored bits in F/F's FOB3 and FEB3 of FIG. 5 to the comparator CP.

The inhibited gate SB4 causes the potential of lead 39 to switch from ground to negative and effects the passage of the negative potential through amplifier ASB4 over the lead 43 to inhibit the gates OB40 and EB40 of FIG. 5 and thereby to prevent the stored bits of the F/F's FOB4 and FEB4 from being passed to the comparator CP. The latter gates, when inhibited, in turn inhibit the gates GO0 and GE0 to cause negative potential to be passed through the amplifiers AO0 and AE0 over leads O0 and E0 to inhibit gate SA2 of FIG. 4. As a result, negative potential is passed from gate SA2 over lead 45 to inhibit the gate SA3 which, in turn, passes negative potential over lead 46 through amplifier SA and lead 47 to the gates LD3 and SA4 of FIG. 4.

At the same time that the operations described in the preceding paragraph occur, the gate SB3 is enabled to cause the potential on lead 38 to switch from negative to ground which results in the passage of ground potential through the buffer amplifier ASB3 over lead 42 to enable the gates OB31 and EB30 of FIG. 5 and thereby to permit the stored bits of the F/F's FOB3 and FEB3 to be passed to the comparator CP. The latter gates are enabled by the coincidence of ground potentials supply to their inputs from the lead 42 and from the output A of F/F FOB3 and output B of F/F FEB3, respectively. The enabled gates OB31 and EB30 in turn enable the gates GO1 and GE0 to pass ground potentials through the amplifiers AO1 and AE0 over the leads O1 and E0 to enable the legitimate digit present gate LD1 of FIG. 4. The enablement of gate LD1 indicates that the digit (5) stored in the circuit ODS is a valid digit. That is, one which is greater than the digit (0) stored in the circuit EDS. It also causes ground to be passed over lead 51 through gate LD5, lead 52, and amplifier LD6 to lead 53 for partially enabling gate LD2 to prepare the latter gate for subsequently sending a ground signal to the register gate RG of FIG. 2 to indicate a valid first digit.

When the potential from output B of the monopulser MP2 is switched from negative to ground at the end of the aforementioned two millisecond interval, the ground is passed therefrom over lead 48 to fully enable gate LD2 to pass ground over lead 50 through amplifier LD to the legitimate digit present lead LDP for in turn enabling gates RB1 and RB3 of FIG. 2 to pass ground potentials over leads 57 and 59 to effect the registration of the binary encoded digit 5 in a first digit register (not shown) of the register REG.

Thereafter, the circuits of FIGS. 2 to 5 remain in the aforementioned conditions as long as the tone signals representing decimal digit 5 are transmitted from the customer telephone set and are received by the receiver MFR.

When the customer releases the telephone set pushbutton, the transmission of the 1336 and 770 tone signals to the receiver MFR is interrupted. The receiver MFR detects the interruption and initiates a sequence of operation which prepares the circuits of FIGS. 2–5 for the receipt of the second digit. Receiver MFR first switches the potentials on the leads 2 and 5 of cable CA1 from ground to negative to inhibit gate T5 of FIG. 2 which, in turn, passes negative potential over lead 11 to inhibit the associated gates TB1 and TB3. As a result, negative potential is coupled over leads 16 and 18 through the amplifiers AB1 and AB3 over the leads 20 and 22 of cable CA2 to inhibit the gates RB1 and RB3 and the gates OB1 and OB3. The inhibited gates RB1 and RB3 cause negative potentials to be re-applied to the leads 57 and 59 of cable CA3 which, in turn, notifies the register REG to prepare its second digit register (not shown) for the receipt of the second digit.

To prepare the circuits of FIGS. 3 to 5 for the receipt of the second digit, receiver MFR also switches the potential on lead DP from ground to negative. This negative potential is coupled to the inputs of gates SA4, LD2, and TD2 to again inhibit the gates. The negative potential is also inverted by the amplifier IA1 to a ground potential which is applied over lead DPA to the inputs of F/F DC and the monopulser MP3. The potential switch on lead DPA operates F/F DC from its "0" to "1" state and causes the potentials available from its outputs A and B to switch to ground and negative, respectively. The negative potential from output B is coupled over lead 24 to the amplifier OD to the lead OE for inhibiting the gates RO1 of FIG. 3 and gates OB1–4 of FIG. 5. The inhibiting of the latter gates prevents the binary bits of the second digit from being subsequently applied to the set inputs of the F/F's FOB1–4. The ground potential from output A of F/F DC is coupled over lead 25 through amplifier EV to the lead EE for partially enabling the gate RE1 of FIG. 3 and the gates EB1–4 of FIG. 5. The partial enabling of the latter gates prepares them for passing the binary bits of the second digit from the translator TR to the set inputs of F/F's FEB1–4.

The potential switch of lead DPA also operates the monopulser MP3 and causes it to change the potential coupled from its output B over lead 54 from ground to negative for two milliseconds. At the end of the two millisecond interval, monopulser MP3 again switches the potential on lead 54 from ground to negative for operating monopulser MP4. When operated, monopulser MP4 changes the potential coupled from its output A over lead 26 from negative to ground for two milliseconds in order to apply a ground pulse to the reset inputs of the F/F's FEB1–4 of FIG. 5 and thereby insure that these F/F's are in the "0" state prior to the receipt of the second digit. This ground pulse is applied over the path extending from lead 26 through amplifier MP, lead 27, the now temporarily enabled gate RE1, lead 28, gate RE2, lead 30, amplifier RE, and lead RSE to said reset inputs.

The two millisecond ground pulse applied to lead 27 is also applied to the reset inputs of F/F's SF1–2 of FIG. 4 to re-cycle the comparator CP and thereby to again prepare it for receiving and comparing the most significant digit bits stored in the circuits ODS and EDS. The F/F SF2 is already in its "0" state, therefore, the reset pulse has no effect on that circuit. The reset pulse does, however, switch the operated F/F SF1 from its "0" to "1" state and, thus, causes the potential at its outputs A and B to switch to negative and ground, respectively. The negative potential from the F/F output A is coupled over lead 32 and inhibits gate SB3 which, in turn, passes a negative potential over lead 38 through amplifier ASB3 and lead 42 to inhibit the gates OB30–1 and EB30–1 of FIG. 5. The ground from output B of F/F SF1 is coupled over the previously described path to lead 43 for enabling, as previously explained, the gates OB40, EB40, GO0 and GE0 of FIG. 5 and the gates SA2 and SA3 of FIG. 4. At the end of the two millisecond interval, the potential supplied at the output A of F/F MP4 is changed again from ground to negative for effecting the disabling of the gates RE1 and RE2 and thereby the removal of the ground potentials from the reset inputs of the F/F's SF1–2 and FEB1–4. The circuits of FIGS. 2 to 5 then await the reception of the second digit.

The second digit of the called number, as assumed previously, is a four. This digit is transmitted, in accordance with Table II, by 1209 and 770 tone signals from the customer telephone set over the previously described path to the receiver MFR when the calling customer depresses the telephone set pushbutton corresponding to a four. When these signals are received by receiver MFR, it changes the potentials on leads 3 and 5 of cable CA1 from negative to ground for enabling the gate T4 to pass ground potential over lead 10 through gate TB3, lead 18, and amplifier AB3 to lead 22; and for thereby producing the four bit binary potential representation of the decimal digit four on the leads 20–23 of cable CA2. The binary representation of the decimal digit four in terms of potentials on the leads 23, 22, 21, and 20 is negative, ground, negative, and negative, respectively.

The ground potential on lead 22 partially enables the gate RB3 of FIG. 2, and fully enables the gate EB3 of FIG. 5, which was partially enabled, as previously explained, by the ground potential coupled from lead EE under control of F/F DC of FIG. 3. The enabled gate EB3 in turn effects the storage of the binary encoded digit four in the storage circuit EDS by passing ground potential to the set input of the F/F FEB3 to operate the F/F to its "1" state and thereby cause the potentials at its outputs A and B to switch to ground and negative, respectively. The ground from its output A partially enables the associated gate EB31 and the negative potential from its output B inhibits the associated gate EB30. The F/F's FEB1–4 are used to register the binary bits of each even order digit. The F/F FEB1 registers the least significant bit, FEB2–3 the intermediate bits, and FEB4 the most significant bit. The states of the F/F's FEB4–1 for registering the digit four are 0, 1, 0, and 0, respectively.

The circuits of FIGS. 4 and 5 are now conditioned for checking the validity of the second digit which is stored in circuit EDS with respect to the first digit which is stored in circuit ODS. It is noted at this point that "0" bits are presently stored in the F/F's FOB4 and FEB4 and that these bits will not yield a check answer regarding the validity of the second digit. Therefore, the circuits of FIGS. 4 and 5 await a signal from the receiver MFR which will cause the comparator CP to compare the other less significant bits stored in the circuits EDS and ODS.

After the second digit is stored in circuit EDS, the receiver MFR grounds the lead DP to initiate a further check of the first and second digits. This ground is inverted by the amplifier IA1 to a negative potential which is applied to the inputs of monopulser MP3 and F/F DC; but, as previously mentioned, none of these circuits operate as a result thereof. The ground on lead DP is also extended to the input of gate SA4 of FIG. 4 to fully enable the gate to pass ground potential to the input of monopulser MP1 to operate it and thereby initiate operations which result in the passage of the stored bits from the F/F's FEB3 and FOB3 to the comparator CP. The operated monopulser MP1, as previously explained, produces a negative potential at its output B for a two millisecond duration and then the potential thereat reverts to ground. This ground potential is then applied to the inputs of the monopulser MP2 and the F/F SF1 to operate both of the circuits. The operated monopulser MP2 inhibits the gates TD2, LD2, and SA4, as previously indicated, for two milliseconds to insure that no false information is passed to the register REG during the period that the comparator CP switches from a comparison of the bits stored in the F/F's FOB4 and FEB4 to those stored in F/F's FOB3 and FEB3.

The F/F SF1 operates from its "0" to "1" state to cause the storage circuits ODS and EDS to pass the stored bits in the F/F's FOB3 and FEB3 to the comparator CP. As previously explained, when the F/F operates, the negative potential from its output B is coupled over lead 34 to inhibit gate SB4 which, in turn, causes the inhibiting of gates OB40 and EB40 to prevent the stored bits in the F/F's FOB4 and FEB4 from being passed to the comparator CP. The ground connected to lead 32 when F/F SF1 operates causes the enablement of gate SB3 which, in turn, passes ground over lead 38 through amplifier ASB3 and lead 42 to fully enable the gates OB31 and EB31 to pass the stored bits (binary 1's) in F/F's FOB3 and FEB3 to the comparator CP. The latter gates are enabled by the coincidence of the ground potentials supplied to their inputs from leads 42 and from the outputs A of F/F's FOB3 and FEB3. The enabled gates OB31 and EB31 in turn enable the gates GO1 and GE1 and thereby cause ground potential to be passed through the amplifier AO1 and AE1 over leads O1 and E1 to enable gate SA1 of FIG. 4. The enablement of gate SA1 indicates that the bits (binary 1's) stored in the F/F's FOB3 and FEB3 are equal and, therefore, do not yield a check answer regarding the validity of the second digit. Hence, the enabled gate SA1 passes ground potential over lead 55 through the gate SA3, lead 46, and amplifier SA to lead 47 to partially enable gate SA4 to prepare the latter gate for subsequently causing the comparator CP to receive and compare the bits (binary "0"s) stored in the F/F's FOB2 and FEB2 of FIG. 5.

When the potential from output B of the monopulser MP2 is again switched from negative to ground at the end of the aforementioned two millisecond interval, the ground is passed therefrom over lead 43 to again fully enable gate SA4 to pass ground potential to the input of the monopulser MP1 to reoperate it. Monopulser MP1, as previously explained, then produces a negative potential at its output B for a two millisecond duration and then the potential reverts to ground. The ground is then applied to the inputs of monopulser MP2 and the F/F SF1 to operate the monopulser and to reset the F/F. When operated, monopulser MP2 again inhibits the gates TD2, LD2, and SA4, as previously indicated, for two milliseconds to insure that no false information is passed to the register REG during the period that the comparator CP switches from a comparison of the bits stored in the F/F's FOB3 and FEB3 to those stored in the F/F's FOB2 and FEB2.

The F/F SF1 is reset from the its "1" to "0" state to cause the storage circuits EDS and ODS to pass the stored bits in the F/F's FOB2 and FEB2 to the comparator CP for comparison. When the F/F resets, negative potential is again coupled from its output A over lead 32 to inhibit gate SB3, which, in turn, causes the inhibiting of gates OB31 and EB31 to prevent the stored bits in F/F's FOB3 and FEB3 from being passed to the comparator CP. At the same time, ground potential is coupled from output B of F/F SF1 over lead 34 to partially enable the gate SB2, and to operate F/F SF2 from its "0" to "1" state and thereby switch the potentials at its outputs A and B to ground and negative, respectively. The ground, which is connected to lead 33 when F/F SF1 operates, causes the enablement of gate SB2 which, in turn, passes ground over lead 37 through amplifier ASB3 and lead 41 to fully enable the gates OB20 and EB20 to effect the passage of the stored bits (binary 0's) in the F/F's FOB2 and FEB2 to the comparator CP. The latter gates are enabled by the ground potential supplied to their inputs from the leads 41 and from the outputs B of the F/F's FOB2 and FEB2. The enabled gates OB20 and EB20 in turn enable the associated gates GO0 and GE0 and thereby cause ground potentials to be passed through the amplifiers AO0 and AE0 over the leads O0 and E0 to enable the sequence advance gate SA2 of FIG. 4. The enablement of gate SA2, as previously mentioned, indicates that the bits (binary 0's) stored in the F/F's FOB2 and FEB2 do not yield a check answer regarding the validity of the second digit. The enabled gate SA2, therefore, passes ground potential over lead 45 through gate SA3, lead 46, and amplifier SA to the lead 47 for partially enabling the gate SA4 to prepare the latter gate for subsequently causing the comparator CP to receive and compare the bits stored in the F/F's FOB1 and FEB1 of FIG. 5.

When monopulser MP2 again switches the potential at its output B from negative to ground at the end of the aforementioned two millisecond interval, the ground is passed therefrom over lead 48 to again fully enable gate SA4 to pass ground to the input of monopulser MP1 to operate it. Monopulser MP1, as previously explained, then produces a negative potential at its output B for two milliseconds and then the potential reverts to ground. The ground is then applied to the inputs of monopulser MP2 and the F/F SF1 to reoperate both of these circuits. When operated, monopulser MP2 again inhibits the gates SA4, TD2, and LD2, as previously indicated, for a two millisecond period to prevent the passage of false information to the register REG during the period that the comparator CP switches from a comparison of the bits stored in F/F's FOB2 and FEB2 to those stored in F/F's FOB1 and FEB1.

When F/F SF1 is reoperated from its "0" to "1" state, it causes the storage circuits EDS and ODS to pass the least significant bit to the comparator CP. When the F/F operates, negative potential is again coupled from its output B over lead 34 to inhibit the gate SB2, which, in turn, causes the inhibiting of gates OB20 and EB20 to prevent the stored bits in F/F's FOB2 and FEB2 from being passed to comparator CP. The ground connected to lead 32 when F/F SF1 operates causes the enablement of gate SB1 which, in turn, passes ground potential over lead 36 through amplifier ASB1 and lead 40 to fully enable the gates OB11 and EB10 to effect the passage of the stored bits (binary "1" and "0") in the F/F's FOB1 and FEB1 to the comparator CP. In addition, the ground on lead 40 is inverted by amplifier IA2 of FIG. 4 to a negative potential which is coupled over lead 44 to inhibit the gate SA4. The ground on lead 40 also partially enables the gate LD3 which, as hereinafter disclosed, is utilized to indicate a valid digit when the digits stored in the circuits EDS and ODS are equal to one another.

The gates OB11 and EB10 are enabled, as previously indicated, by the concident ground potentials applied to their inputs from the lead 40 and from output A of F/F FOB1 and output B of F/F FEB1, respectively. The enabled gates, in turn, enable the associated gates GO1 and GE0 and thereby cause ground potentials to be passed through the amplifiers AO1 and AE0 and over the leads O1 and E0 to enable the gate LD1 of FIG. 4. The enablement of the latter gate indicates that the digit (4) stored in the circuit EDS is a digit which is not greater than the digit (5) stored in the circuit ODS, and hence is a valid digit. It also causes ground potential to be passed over lead 51 through gate LD5, lead 52, and amplifier LD6 to lead 53 for partially enabling gate LD2 to prepare the latter gate for sending a ground signal to the register gate RG to indicate a valid second digit.

Subsequently, when the potential from the output B of monopulser MP2 is switched from negative to ground at the end of the two millisecond timing interval, the ground is passed therefrom over lead 48 to fully enable gate LD2 to pass a ground potential over lead 50 through amplifier LD to the lead LDP for in turn enabling the gate RB3 of FIG. 2 to pass ground potential over lead 59 to effect the registration of the binary encoded digit four in a second digit register (not shown) of the register REG. The circuits of FIGS. 2–5 then remain in this condition as long as the tone signals representative of the digit four are received by receiver MFR.

Before proceeding further with the description of the other operations of the circuits of FIGS. 2–5 relative to the called customer number 548, it is advisable at this point to explain the circuit operations that occur to check the validity of digits when two equal digits are successively transmitted from a customer telephone set to the receiver MFR and, in turn, to the digit storage circuits of FIG. 5. Assume now that the first and second digits transmitted from the customer telephone set are the decimal digit 5 and that these digits are stored respectively in the storage circuits ODS and EDS. Under the the conditions of the supposititious case, the bit register F/F's are in the following operated states: FOB4 and FEB4 in state "0," FOB3 and FEB3 in state "1," FOB2 and FEB2 in state "0," and FOB1 and FEB1 in state "1." It is noted at this point that the comparison of the bits stored in F/F's FOB1–3 and FEB1–3 will not yield a check answer regarding the validity of the second digit with respect to the first digit since these bits are equal to one another. As a result, the comparator CP completes the comparison of the bits stored by these F/F's in the same manner as previously explained and then proceeds to compare the least significant bits stored in F/F's FOB1 and FEB1. It will be recalled from the previous description that, after a comparison of the bits stored in the F/F's FOB2 and FEB2, the F/F SF1 of FIG. 4 is reoperated from its "0" to "1" state to cause the storage circuits ODS and EDS to pass the least significant bits, instead of the bits stored in the F/F's FOB2 and FEB2 to the comparator CP. When the F/F operates, it cooperates with the previously operated F/F SF2, as hereinbefore described, to fully enable gate SB1 to pass ground potential over lead 36 through amplifier ASB1 to lead 40 for partially enabling the legitimate digit present gate LD3 of FIG. 4 and for causing the amplifier IA2 to produce a negative potential which is coupled over lead 44 to inhibit the gate SA4. The ground potential on lead 40 also enables the gates OB11 and EB11 which were both partially enabled by the ground potentials coupled to their input from the outputs A of the operated F/F's FOB1 and FEB1.

The enablement of gate OB11 and EB11 causes ground to be passed through the associated gates GO1 and GE1, the amplifiers AO1 and AE1, and over the leads O1 and E1 to enable the gate SA1 of FIG. 4. The latter gate, as previously explained, when enabled usually indicates that the bits under comparison do not yield a check answer regarding the validity of the digits stored in storage circuits ODS and EDS; however, when the least significant bits are compared and the gate is enabled, it cooperates with the gate LD3 to indicate a valid digit. It is also noted that when the least significant bits are binary 0's rather than binary 1's, as for decimal digit four, the gate SA2 is operated and it performs a similar function to that of gate SA1. When the gate SA1 is so enabled, the gate SA1 passes ground potential over lead 55 through gate SA3, lead 46, and amplifier SA to lead 47 to fully enable the gate LD3 of FIG. 4 to, in turn, pass ground potential over lead 56 through gate LD5, lead 52, and amplifier LD6 to lead 53 for partially enabling the gate LD2 which indicates the presence of a valid digit in the receiver MFR.

Thereafter, when the monopulser MP2 changes the potential available from its output B from negative to ground at the end of the two millisecond timing interval, the ground is coupled therefrom over lead 48 for fully enabling gate LD2 to pass ground potential over lead 50 through amplifier LD to the lead LDP for in turn enabling the gates RB1 and RB3 of FIG. 2 to pass ground potential over the leads 57 and 59 to effect the registration of the second binary encoded digit (5) in a second digit register (not shown) in the register REG. The circuits of FIGS. 2–5 then remain in the described condition as long as the tone signals representing the digit 5 are received by the receiver MFR.

It is also desirable at this point to describe the circuit operations which occur when an invalid digit is transmitted from a customer telephone set. Assuming now that the first and second digits transmitted from the customer telephone set are 4 and 5, respectively (even order digit greater than odd order digit), and that these digits are stored respectively in the storage circuits ODS and EDS. The bit register F/F's in such a case are in the following operated states: FOB4, FOB2, FOB1, FEB4, and FEB2 in the state "0"; and FOB3, FEB3, and FEB1 in the state "1." It is also noted that the comparison of the bits stored in the F/F's FOB1–3 and FEB1–3 will not yield a check answer regarding the validity of the stored digits since these bits are equal to one another. Hence, as previously explained, the comparator CP proceeds from a comparison of these bits to a comparison of the least significant bits stored in the F/F's FOB1 and FEB1. To effect this comparison, the comparator CP connects ground potential to lead 40, as previously explained, for effecting the partial enabling of the gate LD3 of FIG. 4, the inhibiting of gate SA4 of FIG. 4, and the enabling of the gates OB10 and EB11 of FIG. 5. The latter gates were previously partially enabled by the ground potential from the output B of the unoperated F/F FOB1 and output A of the operated F/F FEB1. Upon the enabling of gates OB10 and EB11, ground potential is passed through the associated gates GO0 and GE1, amplifiers AO0 and AE1, over leads O0 and E1 to enable the transposed digit present gate TD1 of FIG. 4 which, in turn, passes a ground potential over lead 49 to partially enable the gate TD2 of FIG. 4.

After the monopulser MP2 changes the potential available at its output B from negative to ground at the end of the previously described two millisecond timing interval, the ground is coupled therefrom over lead 48 to enable the gate TD2 to pass ground potential over lead 49 through amplifier TD to the transposed digit present lead TDP for informing the register REG of FIG. 2 that an invalid digit has been detected.

Register REG then supplies a reorder tone to the tip lead T through the switching network SN of FIG. 1 over the line to the customer telephone set for informing the customer to retransmit the correct number of the desired called customer. In addition, the register REG erases the first digit stored in its first digit register (not shown) and then momentarily grounds the lead R1 for partially enabling the gate CRS of FIG. 3 and thereby conditions that circuit for subsequently causing the resetting of the operated ones of the F/F's FOB1–4 and FEB1–4 to their "0" states and thus preparing them for storing retransmitted digits of the called number.

When the calling customer releases the telephone set pushbutton after the detection of the invalid digit, the transmission of the 1336 and 770 tone signals (which represent the decimal digit 5) to the receiver MFR is interrupted. The receiver MFR detects the interruption and initiates a sequence of operations which prepare the circuits of FIGS. 2–5 for the retransmission of the correct called customer number. Receiver MFR switches the potentials on leads 2 and 5 of cable CA1 from ground to negative for effecting, as previously explained, the inhibiting of the gates T5, TB1, TB3, RB1 and RB3 of FIG. 3, and of gate EB3 of FIG. 5. Receiver MFR also switches the potential on lead DP from ground to negative to inhibit again the gates SA4, LD2, and TD2. The negative potential on lead DP is also inverted by inverter IA1 to a ground potential which is applied over lead DPA to the inputs of the F/F DC to reset the F/F from its "1" to "0" state and thereby cause the potentials at its outputs A and B to switch to negative and ground, respectively. The negative potential from its output A is coupled over lead 25 through amplifier EV to lead EE for again inhibiting the gate RE1 of FIG. 3 and the gates EB1–4 of FIG. 5. The inhibiting of the latter gates prevents the binary bits of the first retransmitted digit from being subsequently applied to the set inputs of the bit register F/F's FEB1–4. The ground potential from output B of F/F DC is coupled over lead 25 through the amplifier OD to the lead OE for partially enabling the gates RO1 of FIG. 3 and the gates OB1–4 of FIG. 5.

The potential switch on lead DPA also operates the monopulser MP3 for two milliseconds and thus causes it to change the potential coupled from its output B over lead 54 from negative to ground. After two milliseconds, monopulser MP3 again switches the potential on lead 54 to negative and thereby effects the operation of monopulser MP4 for two milliseconds. Monopulser MP4 then changes the potential coupled from its output A over lead 26 from negative to ground for effecting the application of a ground pulse to the reset inputs of the following F/F's: DC and SF1–2 of FIG. 4, and FOB1–4 and FEB1–4 of FIG. 5. The ground on lead 27 enables the gate CRS of FIG. 3 to pass a two millisecond ground pulse over lead 61 to the reset input of F/F DC; however, no further circuit action occurs since the F/F is already reset to its "0" state. The ground on lead 61 is also extended to the inputs of gates RO2 and RE2 for enabling these gates to pass ground potential over the leads 30 and 31 through the amplifiers RO and RE, and the leads RSO and RSE to the reset inputs of F/F's FOB1–4 and FEB1–4 for resetting all of the operated ones of these F/F's to their "0" state.

The two millisecond ground pulse applied to the lead 27 is also extended to the reset inputs of F/F's SF1–2 for resetting them to their "0" states and thereby again effecting the preparation of the comparator CP, as previously explained, for receiving and comparing the most significant bits stored in the circuits ODS and EDS. After the two millisecond interval, monopulser MP4 again changes the potential at its output A from ground to negative for effecting the disablement of the gates CRS, RO1, RO2, and RE2 and thereby the removal of ground potentials from the reset inputs of F/F's DC, SF1–2, FOB1–4, and FEB1–4. The circuits of FIGS. 2–5 then remain in the described condition awaiting the receipt of the first retransmitted digit.

When the calling customer releases the telephone set pushbutton at the end of the transmission of a second valid digit, which as previously assumed is a digit 4, the tone signal transmission to the receiver MFR is interrupted for causing the latter circuit to prepare the circuits of FIGS. 2–5 for the receipt of the third digit. Following the tone interruption, receiver MFR switches the potentials on the leads 3 and 5 of cable CA1 from ground to negative for effecting the inhibiting of gates T4, TB3, and RB3 of FIG. 2, and gate OB3 of FIG. 5. The inhibited gate RB3 then passes negative potential over the lead 59 of cable CA3 for notifying the register REG to prepare its third digit register (not shown) for the receipt of the third digit.

Receiver MFR also switches the potential on lead DP from ground to negative after the tone interruption for preparing the circuits of FIGS. 3–5 for the receipt of the third digit. The negative potential on lead DP, as previously explained, again inhibits the gates TD2, LD2, and SA4 of FIG. 4; and causes the resetting of the F/F DC to its "0" state and the operation of the monopulsers MP3 and MP4. When F/F DC is reset, as described previously, negative potential is coupled over lead EE for inhibiting the gates EB1–4 and ground is coupled over lead OE for partially enabling the gates OB1–4 to condition these gates for steering the third digit only to the F/F's FOB1–4. As hereinbefore described, when the monopulser MP4 is operated and F/F DC is reset, a two millisecond ground pulse is coupled over lead 27 to the reset inputs of F/F's SF1–2 and over lead RSO to the reset inputs of the F/F's FOB1–4 for resetting the operated ones of these F/F's to their "0" states. When reset, as hereinbefore explained, the F/F's FOB1–4 are conditioned for registering the third digit, and the F/F's SF1–2 prepare the comparator CP for comparing the most significant bits stored in the circuits ODS and EDS. The circuits of FIGS. 2–5 then await the receipt of the third digit.

The third digit of the called number is an 8. The digit is transmitted by the 1336 and 852 tone signals from the customer telephone set over the aforementioned path to the receiver MFR when the calling customer depresses the telephone pushbutton corresponding to an 8. Upon receiving these tone signals, receiver MFR switches the potentials on the leads 2 and 4 of cable CA1 from negative to ground for enabling the gate T8 to pass ground potential over lead 14 through the gate TB4, lead 19, amplifier AB4 to lead 23; and for thereby producing the four bit binary potential representation of the decimal digit 8 on the leads 20–23 of cable CA2. The potentials on leads 23, 22, 21, and 20 at this time are ground, negative, negative and negative, respectively.

The ground potential on lead 23 partially enables the gate RB4 of FIG. 2; and fully enables the gate OB4 of FIG. 5, which was previously partially enabled by the ground coupled over lead OE under control of F/F DC. The enabled gate OB4 in turn effects the storage of the binary encoded digit 8 in the circuit ODS by passing ground to the set input of the F/F FOB4 to operate the F/F to its "1" state and thereby cause the potentials at its outputs A and B to switch to ground and negative, respectively. The negative potential from its output B immediately effects the inhibiting of the gates OB40 and gate GO0 of FIG. 5 and gates SA2 and SA3 of FIG. 3 and thus causes a negative potential to be applied to the lead 47 for inhibiting the gate SA4 of FIG. 4. The ground from output A of F/F FOB4 enables the gate OB41 to pass ground through the gate GO1, amplifier AO1, and lead O1 for cooperating with the ground which is connected to the lead E0 under control of the unoperated F/F FEB4 to fully enable the gate LD1 of FIG. 4. The enablement of the latter gate, as previously stated, indicates that the digit (8) stored in the circuit ODS is greater than the digit (4) stored in the circuit EDS, and, hence, is a valid digit. When enabled, the gate LD1 passes ground over lead 51 through gate LD5, lead 52, and amplifier LD6 to lead 53 for partially enabling the gate LD2.

Shortly after the third digit is stored in the circuit ODS, receiver MFR grounds the lead DP and fully enables the gate LD2 to pass a ground over lead 50 through amplifier LD to the lead LDP for, in turn, enabling the gate RB4 to pass a ground over lead 60 to effect the registration of the binary encoded digit 8 in a third digit register (not shown) of the register REG. The register REG recognizes the receipt of the last digit, as previously explained, and grounds the lead R1 for partially enabling the gate CRS of FIG. 3 and thereby conditions that circuit for subsequently effecting the reset of the operated F/F's FOB4 and FEB3 to their "0" states. Following the receipt of the last digit of the called number, the register REG utilizes it in the manner well known in the telephony art to control the establishment of connections between the calling and called customer stations.

After the calling customer releases the pushbutton of the telephone set at the end of the transmission of the third digit (8), the 1336 and 852 tone signal transmission to the receiver MFR is interrupted. The latter circuit then detects the interruption and switches the potentials on the leads 2 and 4 of cable CA1 from ground to negative for effecting the inhibiting of the gates T8, TB4, and RB4 of FIG. 2 and gate OB4 of FIG. 5. In addition, receiver MFR at the same time initiates a sequence of operations which result in the restoration of the circuits of FIGS. 3–5 to their idle conditions; that is, to the previously described conditions in which these circuits rested prior to the receipt of the first digit. These restoring operations are essentially the same as those previously described operations which occur when receiver MFR switches the potential on lead DP from ground to negative following the detection of an invalid digit. It is, therefore, suggested that reference be made to the foregoing description for a review of these circuit operations.

As indicated hereinbefore, the check circuitry of FIGS. 2–5 has the capacity to compare $n$ successive digits without the addition of any apparatus thereto. Successive even and odd digits subsequent to the third digit are transmittable from a customer telephone set to the receiver MFR and are checked in substantially the same manner as hereinbefore described. For example, the fourth, sixth . . . digits are checked in essentially the same manner as the second digit. Similarly, the fifth, seventh . . . digits are checked in essentially the same manner as the third digit. In order to compare a series of digits, however, it is necessary, in accordance with the illustrated embodiment of the invention, to adapt the register circuit REG for recognizing the receipt of the last digit in the series so that the register may effect the restoration of the check circuit to its idle condition and utilize the received series of digits for establishing the call connections in the quickest manner.

The check circuitry of FIGS. 2–5 may also be adapted to check the validity of the numbers of an encoding system in which the valid numbers have the odd order digits not greater than the adjacent even order digits. To obtain this result, only one circuit modification is required. This modification requires the interchanging of the input leads EE and OE to the gates EB1–4 and OB1–4, respectively, to allow each odd order digit of a plural order number to be directed to the storage circuit EDS instead of the storage circuit ODS and each even order digit of the same number to be directed to the storage circuit ODS instead of the storage circuit EDS. The other circuit operations involved in checking the magnitude relationship of the odd and even order digits are essentially the same as described in the preceding paragraphs.

It is to be understood that the above-described arrangements are illustrative of the application of the principles of the invention. In light of this teaching, it is apparent that numerous other arrangements may be devised by those skilled in the art without departing from the spirit and scope of the invention.

What is claimed is:

1. A digit transposition detecting system comprising means for receiving odd and even order digits of a number, a pair of storage circuits, control means sequentially applying a plurality of received odd order digits to one of said circuits and a plurality of received even order digits to the other circuit for storage, means activated by said control means for comparing odd and even order digits stored in said circuits, and means responsive to the comparison for detecting a digit transposition.

2. A checking system comprising a pair of gating circuits sequentially receiving odd and even order digits of a number, a pair of storage devices each individually associated with one of the gating circuits, means alternately conditioning said circuits for applying a plurality of the received odd order digits to one of the devices and a plurality of the received even order digits to the other device for storage, means for comparing stored adjacent digits of said number, and means responsive to the comparison for indicating the acceptability of compared digits.

3. A checking system comprising means for sequentially receiving binary bits representing the odd and even order digits of a number, a pair of bit storage circuits, storage control means sequentially controlling the application of received bits of a pluarilty of odd order digits to one of the storage circuits and received bits of a plurality of even order digits to the other storage circuit for storage, a comparator controlled by said control means for comparing stored bits of each of the pairs of adjacent odd and even order digits, means in said comparator responsive to the comparison of stored bits for indicating the acceptability of digits represented thereby, and reset means in said control means activated by said receiving means after each received digit interval for selectively resetting said circuits to erase stored bits therefrom prior to the application of other digit bits thereto.

4. A checking system comprising means for sequentially recieving binary bits representing the odd and even order digits of a number; a pair of bit storage circuits; storage control means sequentially controlling the application of recieved bits of a plurality of odd order digits to one of the storage circuits and received bits of a plurality of even order digits to the other storage circuit for storage; each of said storage circuits including bit registers each having an input and a pair of outputs, and a group of input gates each having an output connected to said input of one of said registers, a first input connected to said receiving means and a second input connected to said control means for controlling the application of a digit bit to the associated register for storage; a comparator controlled by said control means for comparing stored bits of each of the pairs of adjacent odd and even order digits; means in said comparator responsive to the comparison of stored bits for indicating the acceptability of digits represented thereby; and reset means in said control means activated by said receiving means after each received digit interval for selectively resetting said circuits to erase stored bits therefrom prior to the application of other digit bits thereto.

5. A checking system according to claim 4 wherein said storage control means comprises a bistable circuit controlled by said receiving means for supplying electrical conditions to said second input of each of said input gates to enable said gates to apply received bits to said registers.

6. A checking system according to claim 4 wherein each of said storage circuits further comprises a group of output gates each having a first input connected to an output of one of said registers, a second input connected to said comparator, and an output; a pair of final output gate circuits each having a plurality of inputs each individually connected to said output of an output gate, and an output for applying stored bits from said registers to said comparator.

7. A checking system according to claim 6 wherein said comparator comprises a sequence advance circuit for applying electrical conditions to said second input of each output gate to enable said storage circuits to tarnsfer sequentially to said comparator pairs of bits stored in said registers.

8. A checking system according to claim 7 wherein said sequence advance circuit comprises a pair of receiving gates responsive to a pair of bits received from the outputs of a pair of final output gate circuits for producing an advance signal, a plurality of sequence gate circuits, a pair of bistable devices operable for selectively enabling said sequence gate circuits to apply electrical conditions to said second input of each of said output gates, and means responsive to received advance signals for operating said devices.

9. A checking system according to claim 8 wherein said operating means comprises pulse generating means, a control gate responsive to certain advance signals for activating said generating means to produce control pulses for operating said devices, and means controllable by one of said sequence gate circuits for inhibiting said control gate at a predetermined time to block the activation of said generating means.

10. A checking system according to claim 9 wherein said acceptability indicating means includes means responsive to predetermined bits received from said final output gate circuits for producing an acceptable digit signal, and means responsive to other bits received from said final output gate circuits for producing a transposed digit signal.

11. A checking system according to claim 10 further comprising utilization means, and a plurality of transfer gates responsive to the concurrent reception of binary bits from said receiving means and an acceptable digit signal for transferring said last-mentioned bits to said utilization means.

12. A checking system according to claim 11 further comprising a gate for coupling acceptable digit signals to said transfer gates, auxiliary means responsive to the concomitant reception of an electrical condition from said one sequence gate circuit and an advance signal from said receiving gates for enabling said coupling gate to couple an acceptable digit signal to said transfer gates, another gate for coupling a transposed digit signal to said utilization means, and means responsive to each pulse from said generating means for inhibiting the coupling gates to prevent the application of any digit signals to said transfer gates and said utilization means for a period during each operation of said bistable devices.

References Cited by the Examiner

UNITED STATES PATENTS

| | | | |
|---|---|---|---|
| 2,696,599 | 12/54 | Holbrook et al. | 340—147 |
| 2,749,440 | 6/56 | Cartwright | 340—149 |

MALCOLM A. MORRISON, *Primary Examiner*

NEIL C. READ, *Examiner.*